United States Patent
Kuwahara et al.

(10) Patent No.: US 9,008,727 B2
(45) Date of Patent: Apr. 14, 2015

(54) RADIO COMMUNICATION SYSTEM, RADIO COMMUNICATION METHOD, BASE STATION DEVICE AND TERMINAL DEVICE

(75) Inventors: Mikio Kuwahara, Yokohama (JP); Kenzaburo Fujishima, Yokohama (JP); Yunjian Jia, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 13/528,284

(22) Filed: Jun. 20, 2012

(65) Prior Publication Data

US 2013/0005403 A1 Jan. 3, 2013

(30) Foreign Application Priority Data

Jun. 30, 2011 (JP) ................................. 2011-146216

(51) Int. Cl.
*H04B 1/38* (2006.01)
*H04W 48/10* (2009.01)
*H04B 7/08* (2006.01)
*H04B 7/06* (2006.01)
*H04W 88/08* (2009.01)

(52) U.S. Cl.
CPC ............. *H04W 48/10* (2013.01); *H04B 7/0814* (2013.01); *H04B 7/0608* (2013.01); *H04W 88/085* (2013.01)

(58) Field of Classification Search
CPC ............................ H04B 7/0608; H04B 7/0814
USPC ........... 455/561, 562.1, 550.1, 502, 500, 517, 455/507, 509, 508, 515, 422.1, 403, 434, 455/426.1, 426.2, 575.1, 575.7, 445; 370/328, 329, 338, 350, 343, 345, 370/503–514
See application file for complete search history.

(56) References Cited

U.S. PATENT DOCUMENTS

2010/0016023 A1* 1/2010 Yamauchi et al. .......... 455/562.1
2014/0056270 A1* 2/2014 Ahmadi ....................... 370/329

OTHER PUBLICATIONS

IEEE Standard for Local and metropolitan area networks; Part 16: Air Interface for Broadband Wireless Access Systems; IEEE Std 802.16-2009 (Revision of IEEE Std 802.16-2004); May 29, 2009; pp. 311-358.

* cited by examiner

*Primary Examiner* — Keith Ferguson
(74) *Attorney, Agent, or Firm* — Foley & Lardner LLP

(57) ABSTRACT

A base station broadcasts a message saying that transmittable ranging codes are limited by antenna IDs to limit antennas and the ranging codes to be searched, thereby reducing a processing load of the search. In a cellular radio communication system in which a base station device is connected to plural antennas, and antenna IDs for identifying the antennas are transmitted from the respective antennas, the base station device broadcasts a message saying that a group of ranging codes transmittable by a terminal device is limited by the antenna IDs, the terminal device receives the message, identifies the antenna ID, selects the ranging code from the group of the ranging codes corresponding to the antenna ID, and transmits the selected ranging code.

12 Claims, 11 Drawing Sheets

| Antenna ID | Ranging code |
|---|---|
| 0~19 | 0~3 |
| 20~39 | 4~7 |
| 40~59 | 8~11 |
| 60~79 | 12~15 |
| 80~99 | 16~19 |

FIG.8

| Message ID | 0x0d |
| --- | --- |
| The Number of Antenna Groups | N_AntGroup |
| for i=0; i<N_AntGroup { | |
| The Number of Antenna IDs | N_AntID |
| for j=0; j<N_AntID { | |
| Antenna ID | AntID |
| } | |
| The Number of Ranging codes | N_RngCd |
| for j=0; j<N_RngCd { | |
| Ranging code | RngCd |
| } | |
| } | |

FIG.9

| Antenna ID | Transmission Timing |
|---|---|
| 0~19 | T0~T3 |
| 20~39 | T4~T7 |
| 40~59 | T8~T11 |
| 60~79 | T12~T15 |
| 80~99 | T16~T19 |

FIG.10

RADIO COMMUNICATION SYSTEM, RADIO COMMUNICATION METHOD, BASE STATION DEVICE AND TERMINAL DEVICE

CLAIM OF PRIORITY

The present application claims priority from Japanese patent application JP 2011-146216 filed on Jun. 30, 2011, the content of which is hereby incorporated by reference into this application.

BACKGROUND OF THE INVENTION

1. Field of the Invention

The present invention relates to a radio communication system, a radio communication method, a base station device, and a terminal device, and more particularly to a radio communication system, a radio communication method, a base station device, and a terminal device, for transmitting and receiving a synchronous signal in a system where a large number of antennas are dispersed in a cellular radio communication.

2. Description of Related Art

In a radio communication, for example, in a WiMAX system, there is a signal (synchronous signal) called "ranging" transmitted by a mobile device. A base station receives the ranging to be transmitted by the mobile device in an initial access, or to be transmitted periodically. The base station detects a delay of receiving timing of the ranging, and transmits a control signal for correcting the delay toward the mobile device. The mobile device has a mechanism for receiving a timing correction signal, and correcting the timing of a transmission signal.

Also, the mobile device transmits the ranging when transiting from a non-communication state to a communication state, and performs synchronization with a system timing.

As a background art of this technique, for example, there is IEEE802.16e (Non-patent Document 1). This standard document discloses the ranging which is transmitted by the mobile device. The standard document discloses two types of the transmission of the ranging in an asynchronous state and the transmission of the ranging in a synchronous state.

The ranging to be transmitted in the asynchronous state is transmitted mainly when transiting from the non-communication state to the communication state, and intended for synchronization with the system timing. The mobile device selects a specific code at random from plural codes each having a range designated by the base station in advance, and transmits the ranging of the code selected in the timing designated by the base station. In the timing when the base station receives the ranging instructed by the base station, the base station receives the signal transmitted by the mobile device. The base station does not know which code can be received, and therefore there is a need to conduct correlation operation with a received signal, and detect the received ranging for all of the codes. Also, the base station also detects a reception timing shift of the ranging. The base station measures whether the timing of the signal transmitted by the mobile device is delayed or advanced with respect to a timing expected by the base station. The base station then transmits a message for timing correction so that the reception timing falls within a correct range.

The ranging to be transmitted in the synchronous state is mainly transmitted in the communication state, and used for controlling the reception timing changed with the travel of the mobile device to be always kept accurate. The base station transmits an instruction for transmittable timing to the mobile device. Also, the base station designates a ranging code. The mobile device determines whether the ranging can be transmitted at the transmittable timing according to conditions such that another signal is not transmitted. If the ranging is transmittable, the mobile device transmits the ranging by using the designated ranging code.

SUMMARY OF THE INVENTION

In the related art base station, a base station main body is located on a site such as a building where an antenna is installed. However, in recent year, attention has been paid to a distributed antenna system (DAS) in which one base station device has a large number of antennas, and the antennas are distanced from the site such as the building in which the base station main body is installed, and distributed.

The DAS will be described. In the DAS, one base station is connected to a large number of antenna heads. The respective antenna heads can transmit different signals, and can conduct a downlink multi input multi output (MIMO) transmission. In the DAS, the base station main body is not connected to a specific mobile device by using all of the plural antennas unlike the related art, but selects a specific antenna from the large number of antennas, and conducts a communication by using the selected antenna.

Why the specific antenna is selected is that, for example, when processing is conducted by using all of the antennas, a processing load per one mobile device is enormous, and even if the antennas of the number larger than necessary are used, the system efficiency is not enhanced with only an increase in an influence of interference.

When the number of antennas is increased, the processing load is extremely increased in the reception of the ranging. Hereinafter, a problem occurring when the ranging is received by using the large number of antennas will be described.

As the ranging to be transmitted by the mobile device for system synchronization, there are two kinds of signals.

First, in the ranging (asynchronous ranging) to be transmitted in the asynchronous state, the mobile device selects the code at random, and transmits the code. For that reason, the base station needs to implement the correlation operation for all of the plural codes which are candidates regardless of any code to be received, and detect the code. Also, in this case, the base station does not know where the mobile device is. The DAS does not know the signal received by which antenna is to be subjected to the correlation operation. Even if the DAS processes the signals of the receiver antenna including no expected signal, an increase in an influence of interference or noise is merely increased, and the processing amount becomes enormous. For example, assuming the DAS in which one base station has 100 antennas, it is easily conceivable that the processing load becomes enormous as compared with the related art. This is a first problem.

Second, the base station designates the code for the ranging (synchronous ranging) to be transmitted from the mobile device to the system during synchronization. Because an option is limited as compared with the asynchronous state, the processing load is light. However, because the mobile device continues to travel, it is conceivable that even if the base station continues to search the ranging by only the same antenna, the mobile device gradually falls outside of an antenna group that searches the ranging, and the search becomes meaningless. As with the first problem, there has been no mechanism for keeping optimization while updating the antenna group that searches the ranging with hardly increasing the processing load of the base station side. This is a second problem.

The present invention has been made in view of the above circumstances, and therefore an object of the present invention is that a base station receives ranging by using an optimum antenna for communication with a terminal such as a mobile device to reduce a load of the signal processing.

Another object of the present invention is to control an antenna used to receive the ranging with travel of the terminal such as the mobile device, and receive a ranging signal by using only a necessary antenna to receive a load on the base station side.

The above problems have been solved by a radio communication system, a radio communication method, a base station device, and a terminal device in which, in a cellular radio communication system where the base station device is connected to plural antennas, and antenna IDs for identifying the respective antennas are transmitted from the antennas, wherein the base station device broadcasts a message saying that a group of ranging codes transmittable by a terminal such as a mobile device is limited by the antenna IDs, and the terminal such as the mobile device receives the message, identifies the antenna IDs, selects the ranging code from the appropriate group of the ranging codes, and transmits the selected ranging code.

Also, the above problems have been solved by a radio communication system, a radio communication method, a base station device, and a terminal device in which, in a cellular radio communication system where the base station device is connected to plural antennas, and antenna IDs for identifying the respective antennas are transmitted from the antennas, wherein the base station device broadcasts a message saying that a transmission timing of a ranging code transmittable by a terminal such as a mobile device is limited by the antenna IDs, and the terminal such as the mobile device receives the message, identifies the antenna IDs, and transmits the ranging code at the designated timing.

Further, the above problems have been solved by a radio communication system, a radio communication method, a base station device, and a terminal device in which, in a cellular radio communication system where the base station device is connected to plural antennas, and antenna IDs for identifying the respective antennas are transmitted from the antennas, wherein a terminal such as a mobile device has a mechanism for notifying the base station device of a change in an antenna group when the ID of the antenna that can ensure an excellent reception characteristic is changed, and the base station device manages the antenna group for each terminal such as the mobile device, detects a ranging code according to the antenna group, and does not search the ranging for all of the antennas.

According to the first solving means of the present invention, there is provided a cellular radio communication system and a radio communication method in the cellular radio communication system, comprising:
 a base station device; and
 a plurality of antennas connected to the base station device, wherein
 the base station device transmits antenna IDs for identifying the antennas from the respective antennas,
 the base station device broadcasts a message including information saying that a group of ranging codes transmittable by a terminal device is limited by the antenna IDs,
 the terminal device receives the message, identifies the antenna ID, selects one ranging code from the group of the ranging codes corresponding to the antenna ID on the basis of the information, and transmits the selected ranging code, and
 the base station device detects the received ranging code from the group of the ranging codes corresponding to the antenna ID on the basis of the information and method.

According to the second solving means of the present invention, there is provided a cellular radio communication system and a radio communication method in the cellular radio communication system, comprising:
 a base station device; and
 a plurality of antennas connected to the base station device, wherein
 the base station device transmits antenna IDs for identifying the antennas from the respective antennas,
 the base station device broadcasts a message including information saying that a transmission timing at which a terminal device can transmit a ranging code is limited by the antenna IDs,
 the terminal device receives the message, identifies the antenna ID, and transmits the ranging code at the designated timing on the basis of the information, and
 the base station device detects the received ranging code at the transmission timing corresponding to the antenna ID on the basis of the information.

According to the third solving means of the present invention, there is provided a cellular radio communication system and a radio communication method in the cellular radio communication system, comprising:
 a base station device; and
 a plurality of antennas connected to the base station device, wherein
 in a communication state or a synchronous state,
 the base station device transmits antenna IDs for identifying the antennas from the respective antennas,
 a terminal device receives the antenna IDs transmitted by the base station device, and notifies the base station device of a change in an antenna group when the antenna ID of the antenna that can ensure an excellent reception characteristic is changed, and
 the base station device manages the antenna group for each terminal device, and limits the antenna to one or a plurality of antennas within the changed antenna group, and detects a received ranging code when receiving the notification.

According to the fourth solving means of the present invention, there is provided a base station device in a cellular radio communication system, comprising:
 the base station device; and
 a plurality of antennas connected to the base station device, wherein
 the base station device transmits antenna IDs for identifying the antennas from the respective antennas,
 the base station device broadcasts a message including information saying that a group of ranging codes transmittable by a terminal device is limited by the antenna IDs,
 the base station device receives a signal in which the terminal device receives the message, identifies the antenna ID, selects one ranging code from the group of the ranging codes corresponding to the antenna ID on the basis of the information, and transmits the selected ranging code, and
 the base station device detects the received ranging code from the group of the ranging codes corresponding to the antenna ID on the basis of the information.

According to the fifth solving means of the present invention, there is provided a base station device in a cellular radio communication system, comprising:
 the base station device; and a plurality of antennas connected to the base station device, wherein the base station device transmits antenna IDs for identifying the antennas from the respective antennas, the base station device broadcasts a message including information saying that a transmission timing at which a terminal device can transmit a ranging code is limited by the antenna IDs, the base station device receives a signal in which the terminal device receives the message, identifies the antenna ID, and transmits the ranging code at the designated timing on the basis of the information, and the base station device detects the received ranging code at the transmission timing corresponding to the antenna ID on the basis of the information.

According to the sixth solving means of the present invention, there is provided a base station device in a cellular radio communication system, comprising:

the base station device; and a plurality of antennas connected to the base station device, wherein in a communication state or a synchronous state, the base station device transmits antenna IDs for identifying the antennas from the respective antennas, the base station device is notified of a change in an antenna group when the antenna ID of the antenna that can ensure an excellent reception characteristic is changed, where a terminal device receives the antenna IDs transmitted by the base station device, and the base station device manages the antenna group for each terminal device, and limits the antenna to one or a plurality of antennas within the changed antenna group, and detects a received ranging code when receiving the notification.

According to the seventh solving means of the present invention, there is provided a terminal device in a cellular radio communication system, comprising:

the terminal device;

a base station device; and a plurality of antennas connected to the base station device, wherein the terminal device receives, from the base station device, antenna IDs for identifying the antennas from the respective antennas, the terminal device is broadcasted, from the base station device, a message including information saying that a group of ranging codes transmittable by a terminal device is limited by the antenna IDs, the terminal device receives the message, identifies the antenna ID, selects one ranging code from the group of the ranging codes corresponding to the antenna ID on the basis of the information, and transmits the selected ranging code, and the terminal device makes the base station device detect the received ranging code from the group of the ranging codes corresponding to the antenna ID on the basis of the information.

According to the eighth solving means of the present invention, there is provided a terminal device in a cellular radio communication system, comprising:

the terminal device;

a base station device; and a plurality of antennas connected to the base station device, wherein the terminal device receives, from the base station device, antenna IDs for identifying the antennas from the respective antennas, the terminal device is broadcasted, from the base station device, a message including information saying that a transmission timing at which a terminal device can transmit a ranging code is limited by the antenna IDs, the terminal device receives the message, identifies the antenna ID, and transmits the ranging code at the designated timing on the basis of the information, and the terminal device makes the base station device detect the received ranging code at the transmission timing corresponding to the antenna ID on the basis of the information.

According to the ninth solving means of the present invention, there is provided a terminal device in a cellular radio communication system, comprising:

the terminal device;

a base station device; and a plurality of antennas connected to the base station device, wherein in a communication state or a synchronous state, the terminal device receives, from the base station device, antenna IDs for identifying the antennas from the respective antennas, a terminal device receives the antenna IDs transmitted by the base station device, and notifies the base station device of a change in an antenna group when the antenna ID of the antenna that can ensure an excellent reception characteristic is changed, and the terminal device makes the base station device manage the antenna group for each terminal device, and limit the antenna to one or a plurality of antennas within the changed antenna group, and detect a received ranging code when receiving the notification.

According to the present invention, even in the DAS having a large number of antennas (for example, close to 100 antennas), the base station uses an optimum antenna for a communication with the terminal such as the mobile device to receive the ranging, and can reduce a load of the signal processing. Further, the base station and the terminal such as the mobile device can conduct MIMO transmission using the optimum antenna with the aid of that information.

Also, according to the present invention, the antenna used for receiving the ranging is controlled with the travel of the terminal such as the mobile device, and the ranging signal is received by using only the necessary antenna. As a result, the load on the base station side can be reduced.

BRIEF DESCRIPTION OF THE DRAWINGS

FIG. 8 is a diagram illustrating an example of a grouping of antennas and the ranging broadcasted by a base station according to the first embodiment;

FIG. 9 is a diagram illustrating an example of a message for instructing a mobile device on the grouping of the antennas and the ranging broadcasted by the base station according to the first embodiment;

FIG. 10 is a diagram illustrating an example of a grouping of the antennas and transmission timing of the ranging broadcasted by the base station according to a modified example of the first embodiment.

DETAILED DESCRIPTION OF THE INVENTION

Hereinafter, embodiments of the present invention will be described with reference to the accompanying drawings.

1. First Embodiment

In this embodiment, a description will be given of an example in which a base station is bound to antenna IDs and ranging in a DAS.

Also, a mobile device is particularly exemplified, but the present invention is not limited to this example, but can be applied to various radio terminals that conduct a telephone communication or a data communication.

Figure 1:
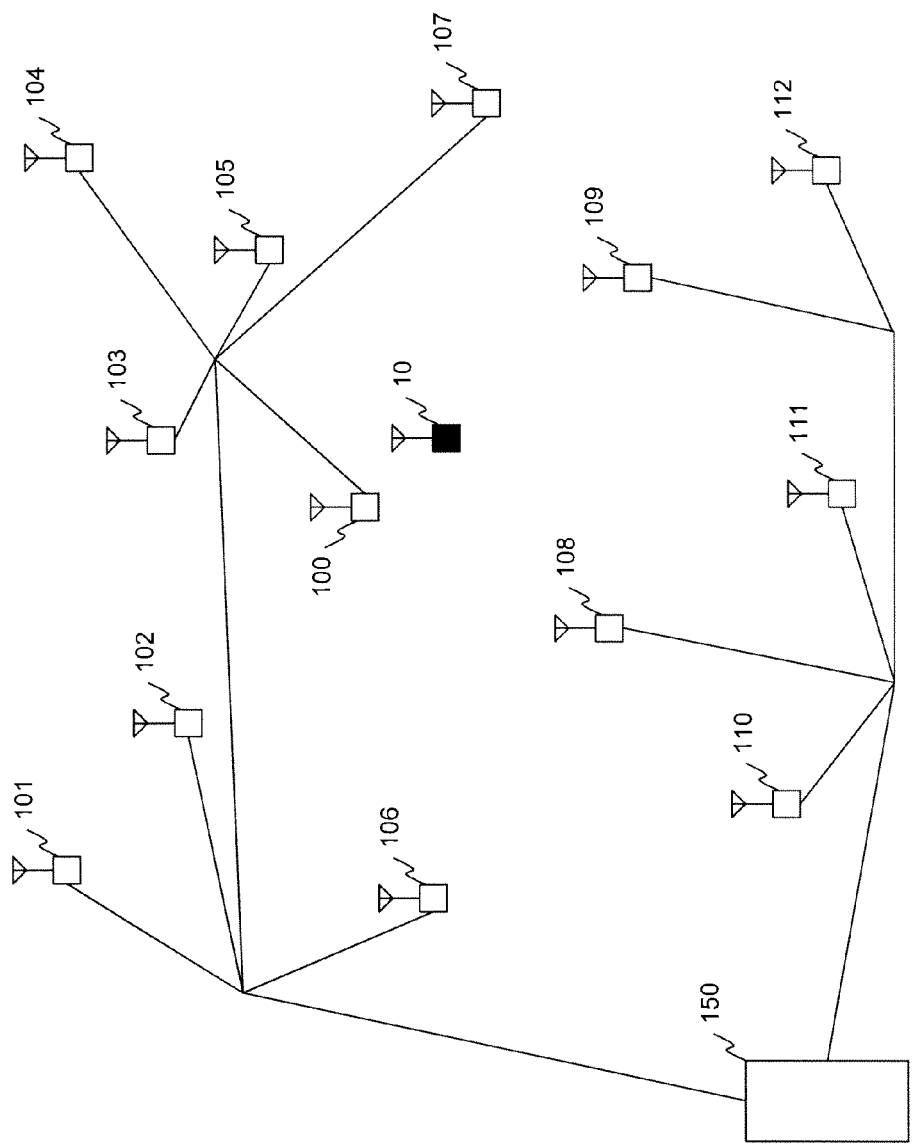
FIG. 1 is a diagram illustrating an example of a configuration of a DAS.

FIG. 1 is a configuration diagram of the DAS. A base station main body device 150 is connected to a large number of antenna heads 100 to 112 by wired connection. Each of the antenna heads 100 to 112 converts a signal transmitted from the base station main body device 150 into a radio frequency, and transmits the signal from an aerial (antenna). Also, the antenna head converts a signal received by the aerial into a baseband signal, and transmits the baseband signal to the base station main body device 150 through the wired connection. The transmitted signal is subjected to signal processing by the base station main body device 150 to extract information.

In this way, a mobile device 10 communicates with the base station main body device 150 through a close antenna (for example, antenna head 100). In each of the antenna heads 100 to 112, a reception intensity of the signal from the mobile device 10 is higher as the antenna head is closer to the mobile device, or as obstacles are less. Accordingly, not all of the antenna heads, but a specific antenna head is selected, and the received signals are combined together so that the reception sensitivity can be increased.

Figure 2:
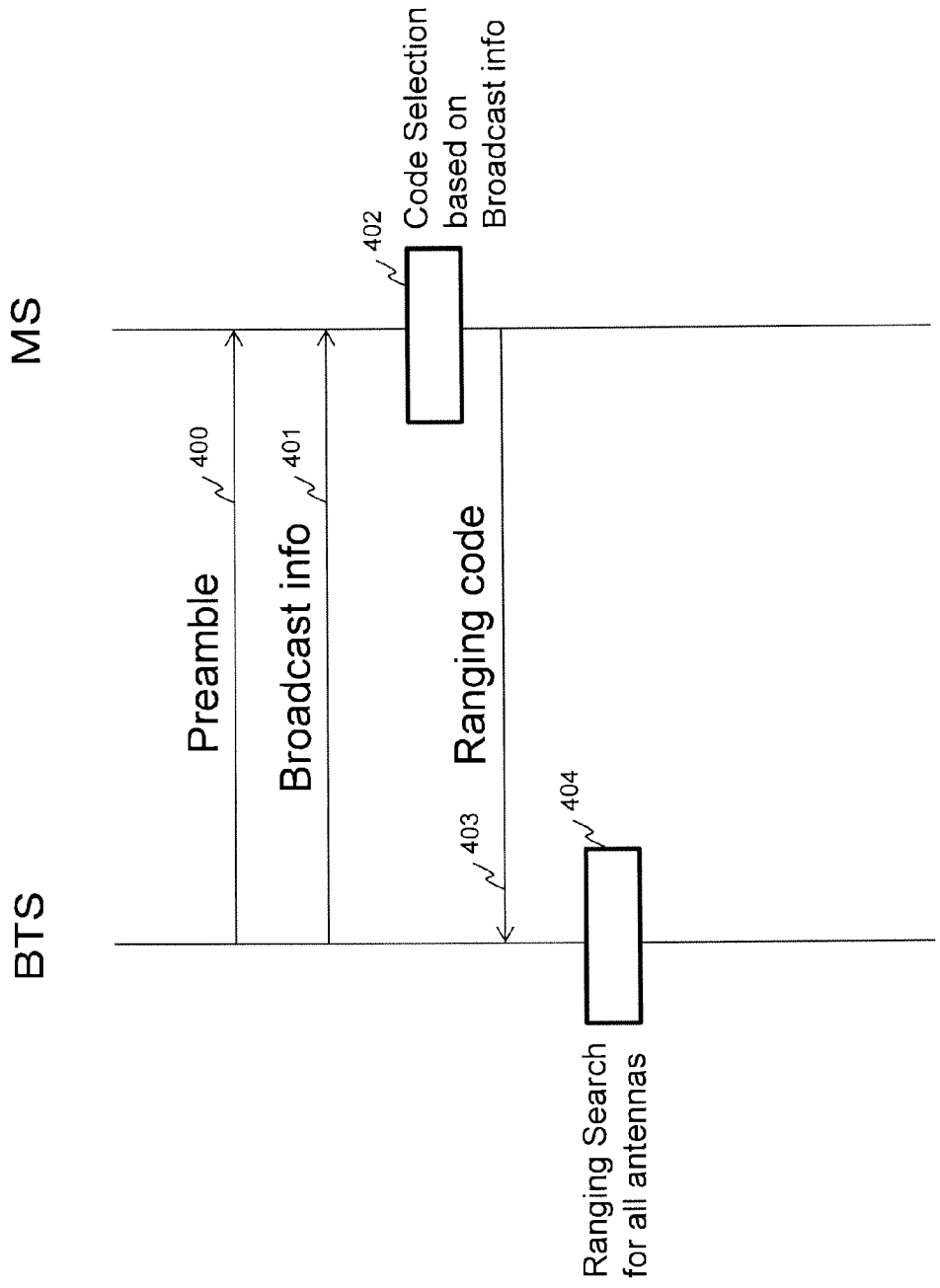
FIG. 2 is a diagram illustrating a sequence example using the selection of a ranging code in a related art of a first embodiment.

FIG. 2 is a diagram illustrating a sequence example using the selection of a ranging code in a related art of a first embodiment.

Hereinafter, a description will be given of a case in which the DAS is supported by using an example of a transmission sequence of ranging in a system before the DAS as illustrated in FIG. 2. Symbol MS denotes the mobile device, and symbol BTS denotes the base station. In FIG. 2, the mobile device first receives a preamble transmitted by the base station (Step 400), and confirms that there is a base station. Further, the mobile device receives information broadcasted by the base station (Step S401), and acquires information on a ranging transmitting method. The "information on the ranging transmitting method" can include, for example, plural ranging codes selectable by the mobile device, and the designation of a transmission timing of the ranging codes. The transmission timing can be designated for the mobile device by the base station in advance, aside from information for broadcasting "information on the ranging transmitting method" (for example, Steps 400 and 401 in FIG. 2, or another message including the timing instruction). The mobile device selects one ranging code from the selectable ranging codes at random, on the basis of the acquired results (Step 402). The mobile device transmits the selected ranging code at the timing and a frequency designated by the base station in advance (Step 403). The base station side checks whether the ranging code is included in the signal received at the designated timing and frequency, or not (Step 404). Although not shown in the sequence diagram of FIG. 2, the base station, when detecting the ranging, returns a response to the ranging to the mobile device to conduct connection processing.

Figure 5:
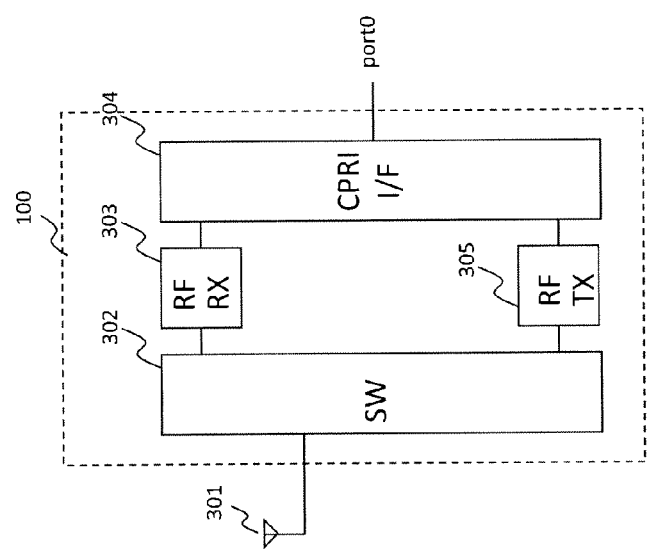
FIG. 5 is a diagram illustrating an example of the configuration of an antenna head of the DAS.

FIG. 5 is a diagram illustrating the configuration of the antenna head 100. The antenna head 100 is connected to the base station main body by the wired connection. In FIG. 5, a side denoted by a port 0 is a line connected to the basic station main body. The antenna head 100 is connected to the base station main body by using an interface such as a CPRI. For that reason, there is an interface unit 304 of the CPRI on the base station main body side. A downlink transmission signal transmitted from the base station main body is converted by the interface unit 304, and input to a radio transmitter 305 as a digital signal. In the radio transmitter 305, the digital signal is converted into an analog signal, and then converted into a radio signal transmittable from the antenna through processing such as frequency conversion, filtering, and power amplification. The converted signal is transmitted to an aerial 301 through a switch unit 302. In this example, a time division duplex (TDD) is exemplified. The switch unit 302 is interposed between a downlink line that transmits a signal from the base station side to the mobile device side, and an uplink line that transmits a signal from the mobile device side and receives the signal by the base station side as illustrated in FIG. 5. In an FDD in which a frequency band is divided, the switch is replaced with a duplexer.

Also, the signal received by the aerial 301 is input to a radio receiver 303 through the switch, and then converted into a digital signal through processing such as signal amplification, filtering, frequency conversion, and the digitalization. The digitally converted signal is transmitted to the base station main body through the interface unit 304.

Figure 6:
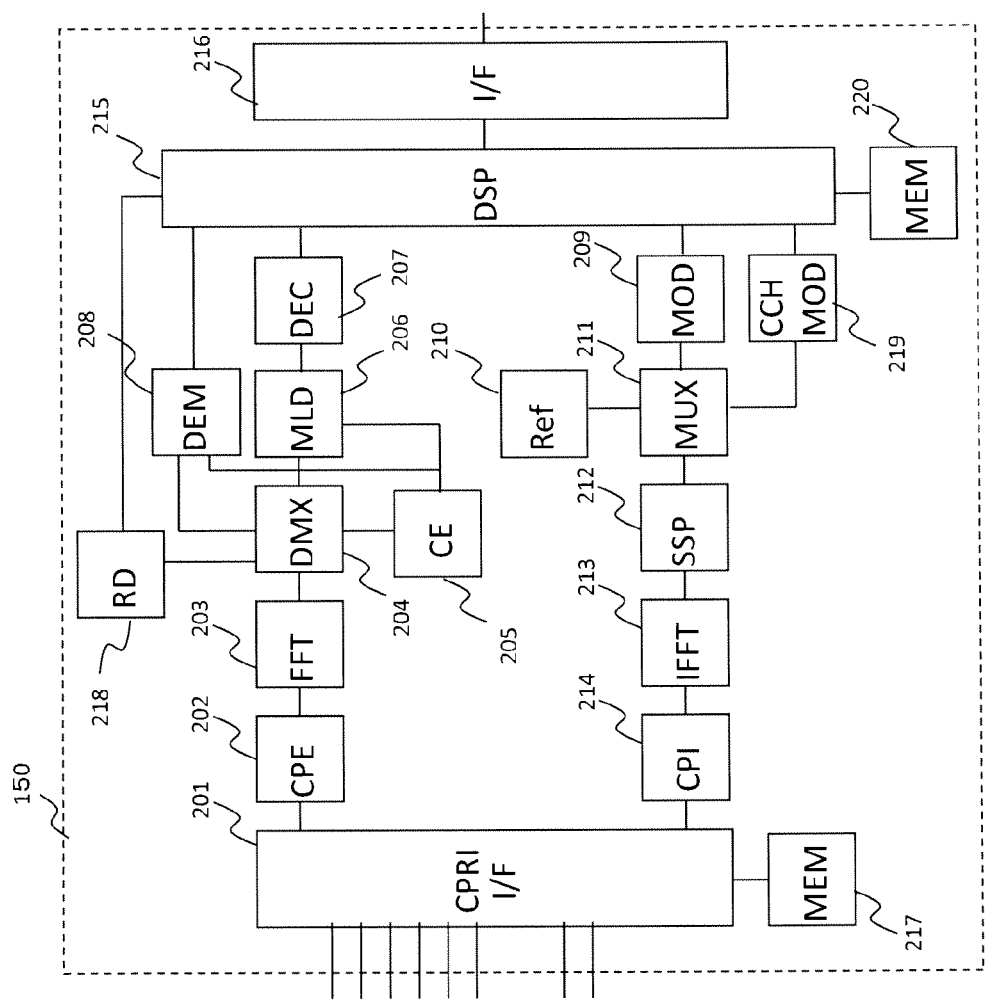
FIG. 6 is a diagram illustrating an example of the configuration of a main body device of the DAS.

FIG. 6 is a diagram illustrating the configuration of the base station main body device 150. A CPRI interface unit 201 interfaces with a side connected to the antenna head. The received signal is stored in a memory 217 once. A CP removal unit 202 removes a cyclic prefix (CP). The signal from which the CP has been removed is subjected to FFT processing by an FFT unit 203, and the signal is converted from time-domain information to frequency-domain information. The received signal that has been converted into the frequency-domain information is resolved into an OFDM symbol, a subcarrier, and an antenna, and becomes information that is arranged in a mesh-like fashion. The positions create the meanings of a data channel or a control channel, and therefore there is a need to resolve the signal into the respective channels. This is conducted by a demapper unit 204.

Information on a ranging area among the resolved information by the demapper unit 204 is received by a ranging detector 218. The ranging detector 218 conducts a correlation operation on plural ranging code candidates and the received signal to detect a ranging code. The results of detecting the ranging are transmitted to a DSP 215. Also, the ranging detector 218 also detects a delay of the detected ranging code, and notifies the DSP 215 of the detected delay amount.

A pilot signal among the information resolved by the demapper unit 204 is received by a propagation channel estimate unit 205. In the propagation channel estimate unit 205, a pilot that is known information is demodulated, and a propagation channel is estimated. In frequencies and time where no pilot is transmitted, the propagation channel is estimated by signal processing such as interpolation.

Data resolved by the demapper unit 204 is transmitted to an MLD unit 206, and then free from MIMO and modulation by using the propagation channel estimated by the propagation channel estimate unit 205. A log-likelihood ratio (LLR) is obtained from the free information, and transmitted to a decoder unit 207. The decoder unit 207 decodes the signal according to the transmitted LLR, and restores the original digital signal. The results are transmitted to the DSP unit 215, and temporarily stored in a memory 220.

The control signal resolved by the demapper unit 204 is transmitted to a demodulator 208. In the demodulator 208, detection is conducted by using the propagation channel estimated by the propagation channel estimate unit 205. Also, in the demodulator 208, the original digital signal is restored by using a Viterbi decoder, and the results are transmitted to the DSP unit 215.

A control software is installed in the DSP unit 215, and, for example, the sequence illustrated in FIG. 2 is implemented on the basis of information of the received control channel and the ranging code. Also, the received data is transmitted to the network side through an interface unit 216 on the network side.

On the other hand, the information transmitted from the network side is transmitted to the DSP unit 215, and temporarily stored in the memory 220. A scheduler loaded in the DSP unit 215 determines the transmission timing and the modulation system. The information to be determined to be transmitted is encoded by a modulator 209, and further subjected to QPSK modulation. The modulated information is transmitted to a mapper unit 211, and arranged in an appropriate portion of the mesh which is divided into the OFDM symbol, the subcarrier, and the antenna.

The control information (including broadcast information) transmitted by the DSP unit 215 is encoded by a control channel modulator 219, and further subjected to QPSK modulation. The modulated information is transmitted to the mapper unit 211, and arranged in an appropriate portion of the mesh which is divided into the OFDM symbol, the subcarrier, and the antenna.

Information required for synchronization such as the pilot is created by a reference signal generator 210. The antenna IDs for identifying the respective antennas are also created by the reference signal generator 210. The antenna IDs are configured by information series uniquely assigned to each antenna. The mobile device knows the entire antenna IDs to be detected on the basis of broadcast information related to the number and type of antennas to be broadcasted. Then, the mobile device sequentially conducts the correlation operation of the received signal and the series related to the antenna ID, thereby being capable of specifying the antenna which is a transmission source of the signal currently received. The created information is transmitted to the mapper unit 211, and arranged in an appropriate portion of the mesh which is divided into the OFDM symbol, the subcarrier, and the antenna.

The mapper unit 211 arranges the information transmitted from the respective modules in appropriate OFDM symbol, subcarrier, and antenna. For example, the antenna ID is information different for each antenna, but the information is arranged on the mesh of "OFDM symbol× subcarrier" created for each antenna. The arranged information is subjected to processing for each antenna by a spatial processor 212, for example, processing for transmission as an MIMO signal. This processing includes, for example, precoding processing for weighting the antennas, and power adjustment. The signal for each antenna that has conducted the spatial processing is extracted for each OFDM symbol in an IFFT unit 213, and converted from the frequency-domain signal to the time-domain signal by the IFFT operation. A CP insertion unit 214 assigns CP to the signal converted into the time domain. The information to which the CP has been assigned is temporarily stored in the memory 217 connected to the CPRI interface unit 201, converted into a signal accepting the CPRI, and then transmitted to each antenna head.

Figure 7:
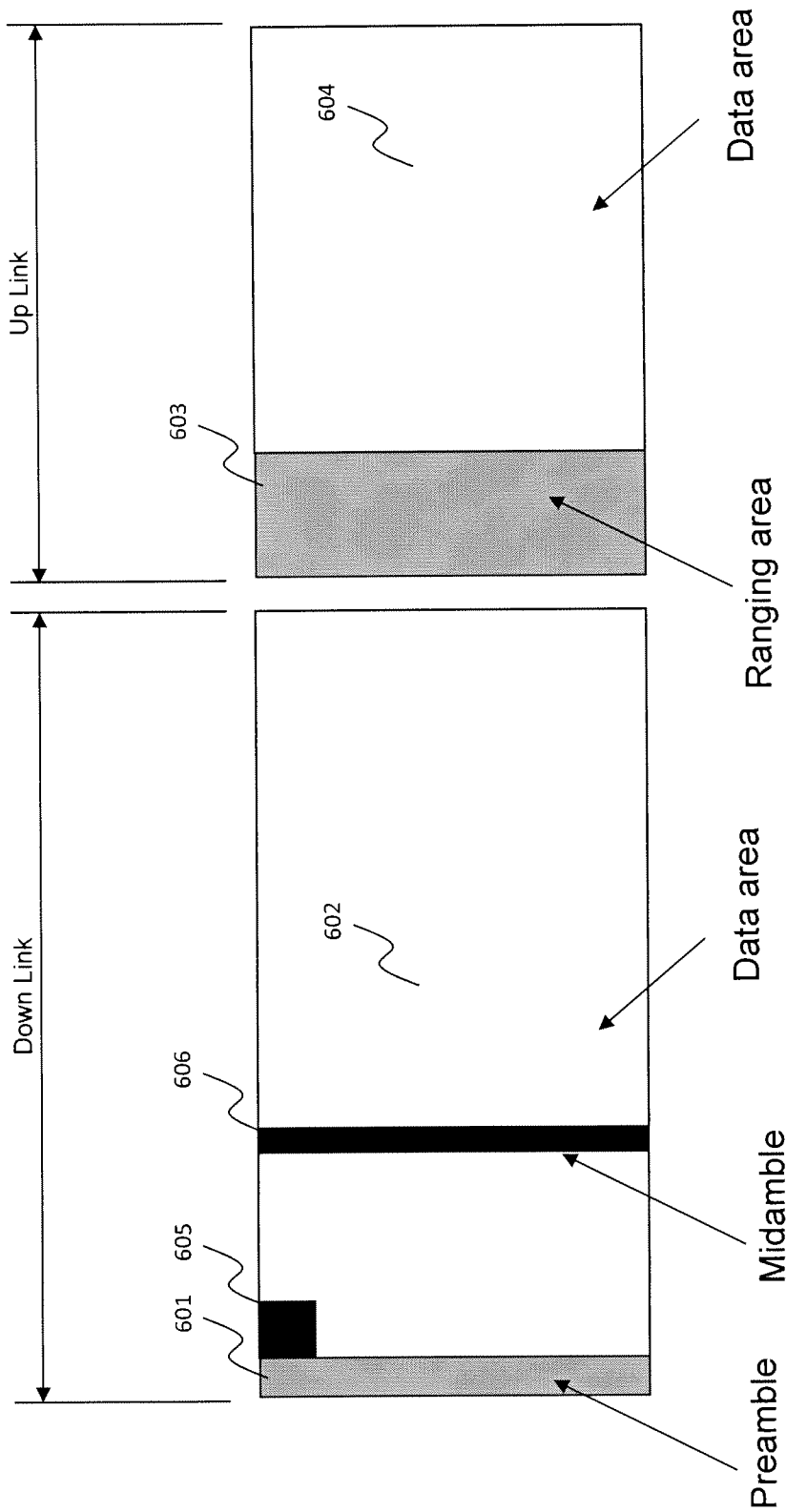
FIG. 7 is a diagram illustrating an example of a resource that transmits ranging.

FIG. 7 is a diagram illustrating how to transmit the ranging or data to the resource represented by frequency× time axis. In FIG. 7, the axis of ordinate represents a frequency axis whereas the axis of abscissa represents a time axis. On the time axis, a left area represents a signal of downlink (direction from base station to mobile device) whereas a right area represents a signal of uplink (direction from mobile device to base station). The ranging is a signal transmitted by the mobile device, and arranged in an area of uplink. The ranging is transmitted in an area hatched in the figure, that is, in a ranging area (603). The ranging area (603) is discriminated from the other areas, for example, a data area (604) that is an area for transmitting data.

Information for identifying the antennas is transmitted in an area of a midamble (606) in the example of FIG. 7. The midamble is information different in transmission pattern for each antenna, and generated by the reference signal generator 210 of the base station main body device 150 described in FIG. 6. An example of the midamble is also illustrated in FIG. 7. The midamble (606) is arranged within a data area (602) of downlink, and arranged in a specific OFDM symbol. Map information (605) indicative of the assignment of the resource within the data area is also broadcasted within the data area (602) of downlink. The preamble is used for base station identification of a physical layer level, and set so that a code different from that of the adjacent base station is transmitted so as to be unique in that area. The broadcast information is temporarily constructed in a data area by the map information (605).

A real signal assignment method is different depending on the system. One of the features of the present invention and this embodiment resides in a system in which information (antenna ID, midamble, etc.) that can identify the antenna in downlink is used, and the limited ranging code is transmitted to the base station, taking a range designation of the ranging code associated with the antenna ID broadcasted with the broadcast information into account.

Figure 3:
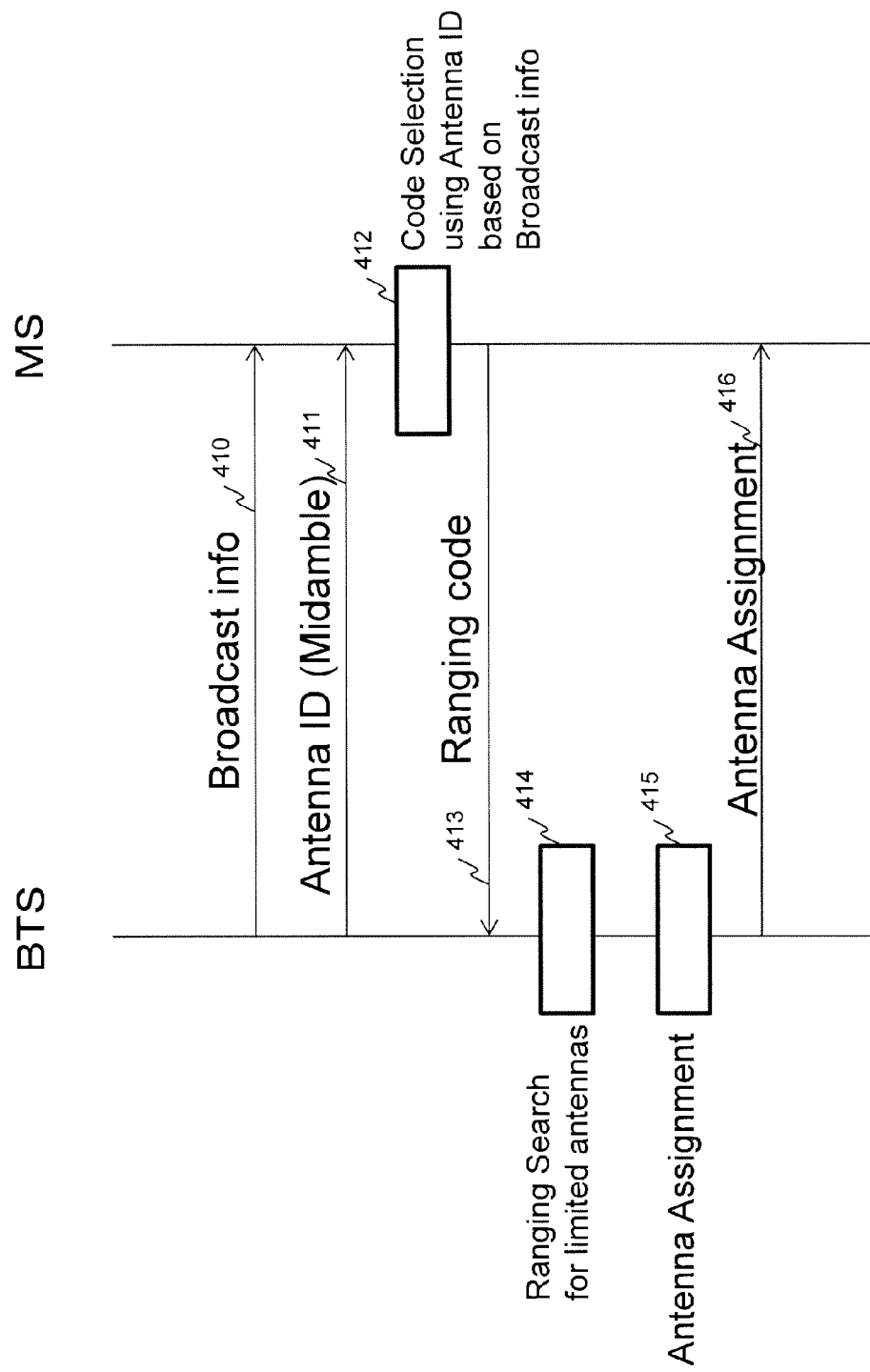
FIG. 3 is a diagram illustrating a sequence example using the selection of a ranging code according to a first embodiment.

FIG. 3 illustrates an example of the ranging sequence according to the first embodiment of the present invention. This example relates to the ranging which is transmitted in an asynchronous state, for example, which is transmitted when transited from a non-communication state to a communication state, and intended for synchronization with the system timing.

Referring to FIG. 3, symbol MS denotes a mobile station, and symbol BTS denotes a base station. Also, in this embodiment, the DAS is assumed. Each antenna transmits a specific code that can be identified individually as the midamble (or preamble). The mobile station receives the broadcast information broadcasted by the base station in advance (Step S410). The mobile station receives the broadcast information transmitted by the base station to acquire information on "information on the ranging that can be transmitted by the mobile device" as illustrated in FIG. 8 which will be described later. Also, the mobile device receives an antenna ID 411, and specifies an antenna that can receive the strongest signal.

In this embodiment, the base station broadcasts, for example, "information on the ranging that can be transmitted by the mobile device" and a base station ID by the broadcast information. Also, the base station transmits, for example, the antenna ID by the midamble. The base station may broadcast, for example, the base station ID by the preamble.

FIG. 8 illustrates an example of a grouping of the antennas and the ranging which are broadcasted by the base station according to the first embodiment.

The "information on the ranging that can be transmitted by the mobile device" is information on the ranging associated with the antenna ID received by the mobile device. The information on the ranging represents, for example, a relationship between the antenna IDs and the useable ranging codes as illustrated in FIG. 8. The base station stores "information on the ranging transmittable by the mobile device" in the storage unit. When receiving the antenna ID (midamble) for specifying the antenna, which is transmitted by the base station, the mobile device derives the transmittable ranging code from the antenna ID and the "information on the ranging transmittable by the mobile device" of the broadcast information (refer to Step 412). The ranging code is defined by the antenna ID with the "information on the ranging transmittable by the mobile device" which is instructed by the base station. Therefore, on the base station side, the antenna that receives the ranging is associated with the received ranging code with reference to the "information on the ranging transmittable by the mobile device". With the above configuration, there is no need to search all of the ranging codes for all the antennas. As a result, the processing load is reduced, and the above-mentioned first problem is solved. The ranging code is limited by the antenna, and the same ranging code is repetitively reused when there is a distance between the antennas so as to cope with the depletion of the codes.

The "base station ID" is information for recognizing the base station. The information is generated by the base station main body device 150 in FIG. 1, and the same base station ID is transmitted to the antenna heads 100 to 112 (antenna ID is different for each antenna head). The mobile station is connected to one base station on the basis of the base station ID, and also connected to a higher-level network. When the base station ID is changed, handover processing for shifting the connection from the current base station (serving station) to that base station (target station) is required. In order to smoothly implement the above procedure, the base station ID is transmitted.

Returning to FIG. 3, the processing subsequent to Step 412 will be described.

When it is assumed that the antenna ID is, for example, 17, it is found from a list of FIG. 8 that four codes of 0 to 3 can be used as the ranging code. The mobile device selects one ranging code at random (or in a predetermined order) from the four codes (Step 412). The mobile device transmits the selected ranging code at the timing and the frequency which are designated by the base station in advance (Step 413). The transmission timing can be designated for the mobile station from the base station in advance (for example, Steps 410 and 411 in FIG. 3, or the other messages including the timing instruction). The base station side detects a ranging code having a relationship illustrated in FIG. 8 with a specific antenna, in addition the designated timing and frequency. For example, in the system where there are 100 antennas, and 20 ranging are permitted, 100×20=2000 detections are required. On the other hand, in this embodiment, only four codes are detected per 20 antennas. Therefore, only 20×4×5=400 detections are necessary, and a load required for checking the ranging code can be remarkably reduced.

Subsequently, a description will be given of a method of notifying a relationship between the antenna IDs and the ranging codes illustrated in FIG. 8. A notification using a message illustrated in the subsequent drawing is exemplified.

FIG. 9 illustrates an example of a message for instructing the mobile device on a grouping of the antenna and the ranging which is broadcasted by the base station according to the first embodiment. The base station transmits information assigned with a message ID as the broadcast information. In this example, it is assumed that 0x0d is a message corresponding to the message ID. As the contents of the message, the number of antenna groups is subsequently declared. For example, in the example of FIG. 8, as the number of antenna groups, five antenna groups are declared since there are five groups defining a range of the transmittable ranging by the antenna ID. Then, a For loop that defines the contents for each antenna group is entered. In the For loop, the number of antenna IDs included in the antenna group is first designated. Then, the For loop of the antenna IDs is entered according to the number of antenna IDs. In the For loop, the antenna IDs are designated one by one. When the designation of the antenna IDs has been completed, the transmittable ranging code is then designated. For that reason, the number of ranging codes transmittable by this antenna group is designated. Then, a For loop of the number of the ranging codes is entered. In the For loop, the transmittable ranging codes are designated one by one. Thus, a relevancy between the antenna IDs of each antenna group and the ranging codes are defined.

In the related-art method, if the antenna IDs and the ranging codes are not defined, the usable range is designated as the ranging from the broadcast information for the mobile device. The mobile device selects a ranging code from the designated ranging codes regardless of the closest antenna on the basis of that information to determine the ranging code. The base station side has no relevancy between the antennas and the ranging codes, and therefore needs to conduct the correlation operation related to all of the ranging codes with respect to all the antennas. As a result, the processing amount is increased in proportion to the number of antennas.

On the contrary, in the present invention and this embodiment, the base station checks whether the ranging code is included in the received signal, or not. If the ranging code is included, the base station refers to the "information on the ranging transmittable by the mobile device", and searches plural ranging codes for the antenna ID of the antenna that receives the ranging, and specifies the ranging code (Step 414). Then, in the DAS, because the base station needs to determine which antenna is to be used, the base station assigns the antenna resource (Step S415). Although there is no stipulation in the standard, if the base station notifies the mobile device of the assigned antenna resource in advance, when the mobile device moves to an area of another antenna, the mobile device can notify the base station of this fact. For that reason, the base station notifies the mobile device of the assigned antenna resource (Step 416).

2. Modified Example of First Embodiment

In the above-described embodiment, there is provided a method of grouping the antenna codes. However, the present invention can be implemented by the other methods. For example, to group the timing at which the ranging is transmitted for each antenna ID also falls with the scope of the present invention.

In this case, for example, the "information on the ranging transmittable by the mobile" is replaced with "information on timing at which the mobile device can transmit the ranging".

FIG. 10 illustrates an example of a grouping of the antennas and the transmission timing of the ranging, which are broadcasted by the base station according to a modified example of the first embodiment. In FIG. 10, the transmission timing is designated for the antenna ID. In this example, the transmission timing determines a time range such as T0 to T3. However, the present invention is not limited to this configuration, but a time may be designated for the antenna ID.

Figure 11:
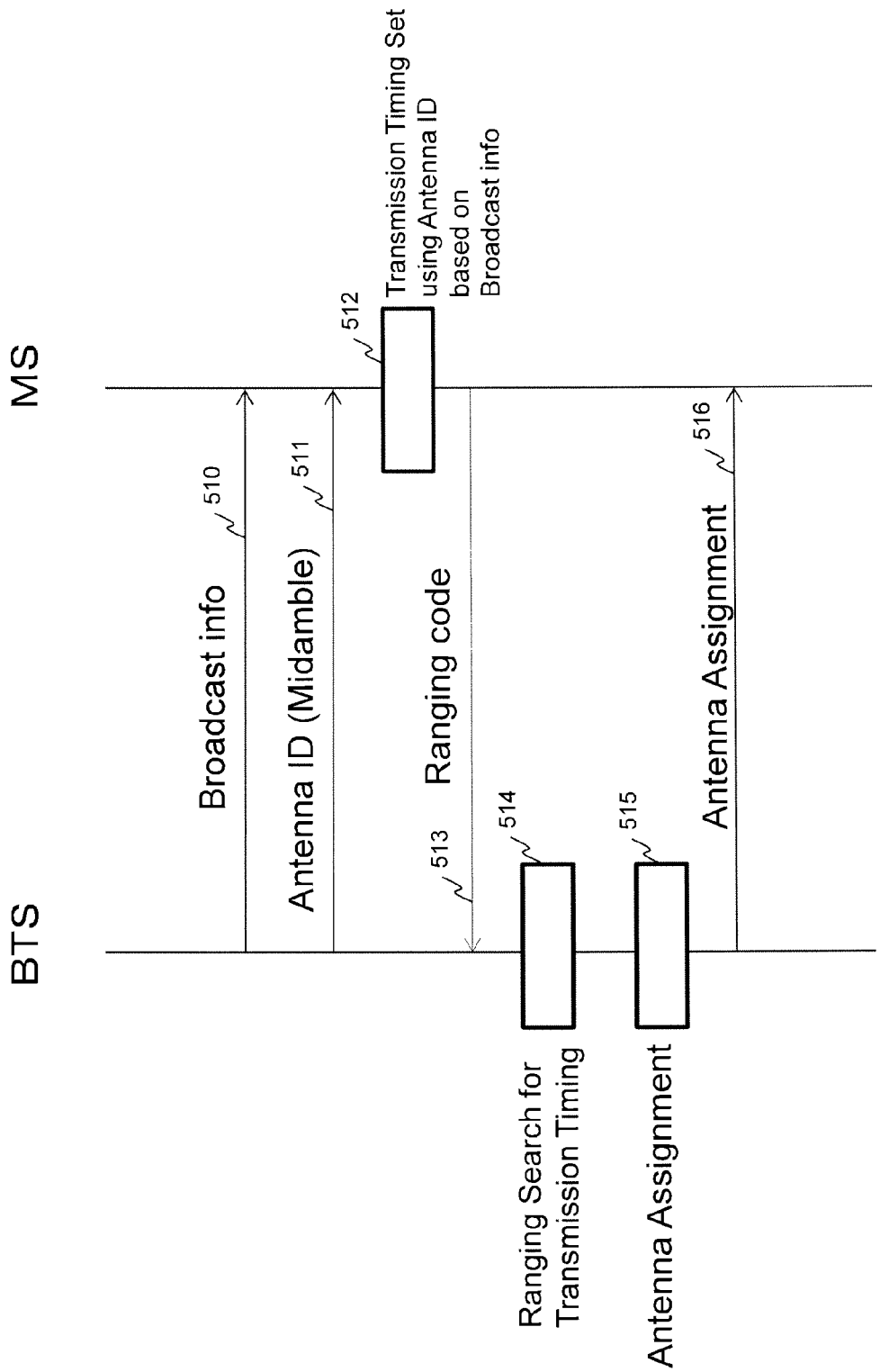
FIG. 11 is a diagram illustrating a sequence example using the selection of the ranging code according to the modified example of the first embodiment.

FIG. 11 illustrates an example of the sequence diagram using the selection of the ranging codes according to the modified example of the first embodiment.

The mobile device receives the broadcast information that is broadcasted by the base station in advance (Step S510). When receiving the broadcast information transmitted by the base station, the mobile device acquires information on the "information on the timing at which the mobile device can transmit the ranging" as illustrated in FIG. 10, and plural ranging codes that can be selected by the mobile device. The plural ranging codes that are selectable by the mobile device can be set in the mobile device from the base station by another message such as the "information on the ranging transmitting method" in Step 401 of FIG. 2, in advance. The base station stores the "information on the timing at which the mobile device can transmit the ranging" in the storage unit. Also, the mobile device receives the antenna ID (Step 511), and specifies the antenna that can receive the strongest signal.

When receiving the antenna ID (midamble) for specifying the antenna transmitted by the base station, the mobile device derives the transmittable timing from the received antenna ID and the "information on the timing at which the mobile device can transmit the ranging" (Step 512). Also, the mobile device selects one ranging code from the selectable ranging codes broadcasted from the base station at random (or in a predetermined order) (Step 512). The mobile device transmits the selected ranging code at the derived timing and the frequency designated by the base station in advance (Step 513). The base station checks whether the ranging code is included in the received signal, or not. If the ranging code is included, the base station refers to the "information on the timing at which the mobile device can transmit the ranging" in FIG. 10, and searches a predetermined time range or time, or given time ranges before and after the designated time according to the transmission timing of the antenna ID of the antenna that receives the ranging, and specifies the ranging code (Step 514). Then, in the DAS, the base station needs to determine which antenna to be used, and therefore the base station assigns the antenna resource (Step 515). Although there is no stipulation in the standard, if the base station notifies the mobile device of the assigned antenna resource in advance, when the mobile device moves to an area of another antenna, the mobile device can notify the base station of this fact. For that reason, the base station notifies the mobile device of the assigned antenna resource (Step 516).

In this embodiment, even in a case where the total number of ranging codes is limited, since the same ranging code can be repetitively used for each antenna, which is an advantage. Also, because the load to be processed at a time can be temporally dispersed, the above problem can be solved.

3. Ranging Signal Detection

An example of the ranging signal detection will be described. The following ranging signal detection processing is executed by, for example, the ranging detector 218.

The base station conducts the FFT processing, extracts the ranging area illustrated in FIG. 7, and thereafter conducts the following arithmetic operation on information divided into subcarriers.

$$R_i = \sum_h \sum_k y_h(k) c_i^*(k) \{y_h(k+1) c_i^*(k+1)\}^* \quad \text{(Ex. 1)}$$

Then, the base station detects the transmitted ranging codes while switching from one code to another. In the expression, $R_i$ is a correlation detection value. If this value is larger than a predetermined threshold value, it is deemed that the appropriate ranging code has been detected. $Y_h(k)$ is a received signal of a subcarrier k of an antenna h. $C_i(k)$ is a code of the subcarrier k of an i-th ranging code. Symbol * represents conjugate. The propagation channel estimate cannot be conducted in the ranging. Under the circumstances, assuming that the propagation estimate results between the adjacent subcarriers are hardly changed, an influenced portion of the propagation channel is canceled by using the adjacent subcarriers to obtain correlation.

In an example of IEEE802.16, as the ranging code, the following Zadoff-Chu code represented by the following expression is used.

$$c_p(k) = \exp\left(-j\pi \frac{r_p k \cdot (k+1) + 2 \cdot k \cdot s_p N_{CS}}{N_{RP}}\right) k = 0, 1, \ldots, N_{RP} \quad \text{(Ex. 2)}$$

where $N_{RP}$ is the number of subcarriers occupying the code, and $r_P$ is a parameter of a generating function, $S_P$ is the value mod (p, Mns), which is calculated from the index (p) for the ranging preamble code and the number of Cyclic shifted code (Mns), and $N_{CS}$ is the unit of cyclic shift according to the cell size. k is subcarrier number.

In the detection of a delay of the ranging signal, with the use of the code detected in Expression 1, arithmetic operation represented by the following expression is conducted.

$$d = \sum_h \sum_k y_h(k) c_i^*(k) \{y_h(k+\text{int}) c_i^*(k+\text{int})\}^* \quad \text{(Ex. 3)}$$

$$\Delta = a\tan2(imag(d), real(d))$$

$$\delta = \Delta / 2\pi * FFTsize$$

Then, the delay of the ranging signal can be estimated according to a mean phase rotation between subcarriers (distance int) slight distant from each other. For example, when it is assumed that the obtained phase rotation is Δ, that a shift occurs by Δ/(2π/FFT size) sample can be detected.

The base station calculates a correction value of the timing according to the obtained delay information. For example, when the signal is received with a delay of δ sample, the base station transmits an instruction for accelerating δ sample transmission to the mobile device as correction information. In FIG. 3, a correction instruction of the timing is included in the message of the antenna assignment (416).

In this embodiment, an example in which the antenna ID is transmitted with the use of the midamble is described. However, the midamble may be replaced with preamble. For the purpose of specifying the antenna, if the specific code is assigned to the OFDM symbol, any configurations fall within the scope of the present invention and this embodiment regardless of the names.

4. Second Embodiment

A case in which the mobile device comes to the communication state, and periodically transmits the ranging will be described with reference to a second embodiment of the present invention.

Figure 4:
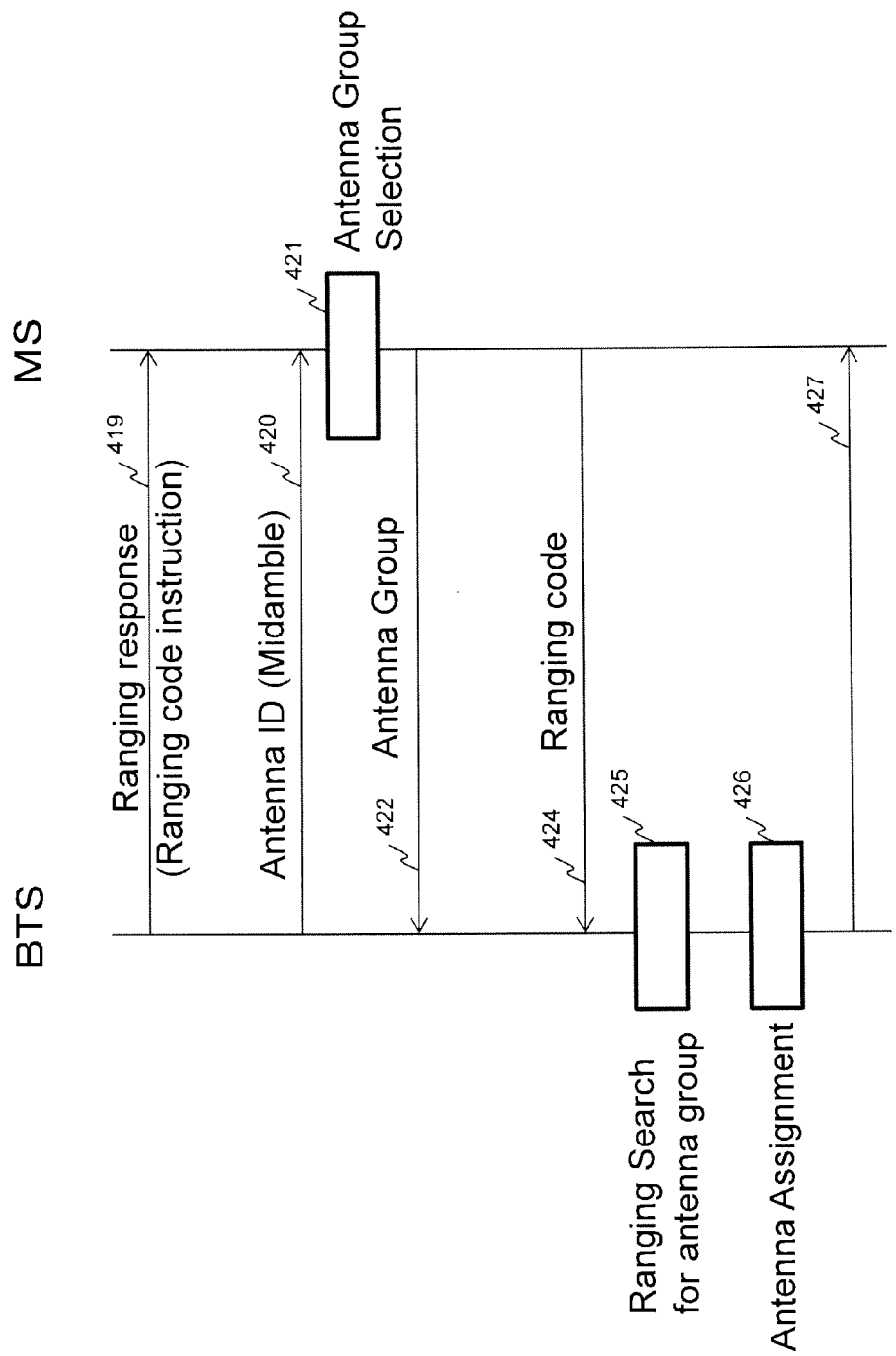
FIG. 4 is a diagram illustrating a sequence example of negotiating an antenna group in ranging transmission according to a second embodiment.

FIG. 4 illustrates an example of a sequence diagram for negotiating the antenna group in the ranging transmission according to the second embodiment. This example mainly relates to the ranging to be transmitted in the synchronous state, and, for example, is used to control the reception timing changed with the movement of the mobile device to be always kept correct, in the ranging to be transmitted in the communication state.

In this embodiment, the mobile device periodically monitors the antenna IDs. With the movement of the mobile device, the antenna providing an optimum reception quality is switched, and another antenna ID becomes an optimum reception object. In this case, the mobile device checks whether the antenna group broadcasted by the base station has been changed, or not, on the basis of the antenna ID. The antenna group broadcasting method using the "information on the ranging that can be transmitted by the mobile device" as illustrated in FIG. 8 is conducted by the dedicated message (broadcast information) described in the first embodiment. Also, the ranging code used in periodic ranging (Step 424) is instructed by the base station, with a ranging response message (Step 419) in advance. The mobile device receives, from the base station, an instruction of the timing at which the ranging code can be transmitted, in advance (for example, Steps 410, 411 in FIG. 3, Steps 419, 420 in FIG. 4, or another message including the timing instruction).

The mobile device receives the antenna ID (Step 420) transmitted by the base station. The mobile device, for example, compares a signal quality of the antenna ID received up to now with a signal quality of the antenna ID newly received. If the signal quality of the antenna ID newly received is higher than that of the previous antenna ID, the mobile device recognizes that the optimum antenna has been changed. If the optimum antenna has been changed, the mobile device executes a procedure for determining whether the antenna group is to be changed, or not (Step 421). In this procedure, the mobile device determines whether the antenna group determined according to the antenna ID that is currently optimum has been changed from the antenna group to which has previously belonged, or not. The mobile device determines whether the optimum antenna ID has been changed from the previous antenna group to another antenna group, or not, according to the relationship between the antenna IDs broadcasted by the base station and the antenna groups illustrated in FIG. 8, to detect whether the antenna group has been changed, or not. Upon the detection of a change in the antenna group, the mobile device notifies the base station of this fact (Step 422). This notification can include, for example, the optimized antenna ID or identification information on the antenna groups to which the optimized antenna belongs. The mobile device transmits (Step 424) the ranging signal according to an instruction (Step 419) from the base station. The ranging code is also instructed (Step 419) by the base station. The mobile device transmits the instructed ranging code at the transmittable timing which is instructed from the base station in advance (Step 424).

The base station side does not receive the appropriate ranging codes by using all of the antennas, but detects the appropriate ranging code for only the specific antenna on the basis of a predetermined standard. The antenna in question is selected on the basis of the notification of the antenna group already notified from the mobile device. The mobile device is configured to immediately notify the base station of a case in which the antenna group candidate has been changed. Therefore, the antenna that receives the periodic ranging has only to be selected from the above antenna group.

For example, when receiving the optimized antenna ID, the base station refers to the information where the relationship between the antenna IDs and the antenna groups is stored in advance in the table of FIG. 8 or another table, specifies the antenna group according to the received antenna ID, and can detect the ranging code through the correlation processing, for the antennas within the specified antenna group. On the other hand, when receiving the identification information on the antenna group to which the optimized antenna belongs, the base station refers to the information where the association between the antennas and the antenna groups is stored in advance in the table of FIG. 8 or another table, and can detect the ranging code through the correlation processing, for the antennas within the received antenna group. Further, the base station refers to the table in FIG. 8 or another table to limit the ranging codes of the antenna group corresponding to the optimum antenna ID. Therefore, the base station conducts the correlation processing with the limitation of those ranging codes in addition to the limitation of the antenna group, and can detect the received ranging codes.

Hence, a load on the base station side can be reduced by reception of the periodic ranging, and the above-mentioned second problem is solved.

The base station notifies the mobile device of the assignment information of the antennas determined by reception of the ranging in response to a selection information 422 of the antenna group notified by the mobile device (Step 427).

The periodic ranging can be transmitted at the timing designated by the base station. Also, after coming to the connection state, the code used for the periodic ranging is instructed from the base station for each mobile device, individually. The timing at which the periodic ranging may be transmitted is notified the mobile device of by the broadcast information. In the individual ranging codes, a massage (RNG_REP) for designating the ranging code is transmitted from the base station, the mobile device transmits the ranging by the code corresponding to the instruction. The transmission timing may not always be periodical. When a signal higher in priority order than the ranging is transmitted, the transmission of the ranging is pending, and waits for a next chance.

What is claimed is:
1. A cellular radio communication system, comprising:
a base station device configured to receive a ranging signal from a terminal device in an initial access of the terminal device or periodically or when transitioning from a non-communication state to communication state; and
a plurality of antennas connected to the base station device, wherein
the base station device is configured to transmit antenna IDs for identifying the antennas from the respective antennas;
the base station device, by grouping the plurality of antennas into a plurality of antenna groups, is configured to broadcast a message including one or more antenna IDs belonging in each of the antenna groups and information saying that a group of usable ranging codes where the terminal device transmits the ranging signal is limited for each of the one or more antenna IDs;

the terminal device is configured to:
receive the message;
identify the antenna ID;
select one ranging code from the group of the usable ranging codes corresponding to the antenna ID based on the information; and
transmit the selected ranging code; and the base station device is configured to detect the received ranging code by making the group of the usable ranging codes of the antenna which receives the ranging signal a candidate on the basis of the information.

2. A cellular radio communication system, comprising:
a base station device configured to receive a ranging signal from a terminal device in an initial access of the terminal device or periodically or when transitioning from a non-communication state to communication state; and
a plurality of antennas connected to the base station device, wherein
the base station device is configured to transmit antenna IDs for identifying the antennas from the respective antennas;
the base station device, by grouping the plurality of antennas to a plurality of antenna groups, is configured to broadcast a message including one or more antenna IDs belonging in each of the antenna groups and information saying that a transmission timing at Which a terminal device can transmit a ranging code is limited for each of the one or more antenna IDs;
the terminal device is configured to:
receive the message;
identify the antenna; and
transmit the ranging signal at the designated transmission timing based on the information; and
the base station device is configured to detect the received ranging code at the transmission timing assigned to the antenna which receives the ranging signal based on the information.

3. A cellular radio communication system, comprising:
a base station device; and
a plurality of antennas connected to the base station device, wherein
in a communication state or a synchronous state,
the base station device is configured to transmit antenna IDs for identifying the antennas from the respective antennas;
a terminal device is configured to receive the antenna IDs transmitted by the base station device, and notify the base station device of a change in an antenna group when the antenna ID of the antenna that can ensure an excellent reception characteristic is changed; and
the base station device is configured to manage the antenna group for each terminal device, and limit the antenna to one or a plurality of antennas within the changed antenna group, and detect a received ranging code when receiving the notification.

4. A radio communication method in a cellular radio communication system comprising:
a base station device configured to receive a ranging signal from a terminal device in an initial access of the terminal device or periodically or when transiting from a non communication state to communication state; and
a plurality of antennas connected to the base station device, wherein the method comprises
transmitting, by the base station device, antenna IDs for identifying the antennas from the respective antennas,
broadcasting, by the base station device, by grouping the plurality of antennas to a plurality of antenna groups, a message including one or more antenna IDs belonging in each of the antenna groups and information saying that a group of usable ranging codes where the terminal device transmits the ranging signal is limited for each of the one or more antenna IDs,
receiving, by the terminal device, the message;
identifying, by the terminal device, the antenna ID;
selecting, by the terminal device, one ranging code from the group of the usable ranging codes corresponding to the antenna ID based on the information; and
transmitting, by the terminal device, the selected ranging code; and
detecting, by the base station device, the received ranging code by making the group of the usable ranging codes of the antenna which receives the ranging signal a candidate based on the information.

5. A radio communication method in a cellular radio communication system comprising:
a base station device configured to receive a ranging signal from a terminal device in an initial access of the terminal device or periodically or when transiting from a non-communication state to communication state; and
a plurality of antennas connected to the base station device, wherein the method comprises
transmitting, by the base station device, antenna IDs for identifying the antennas from the respective antennas,
broadcasting, by the base station device, by grouping the plurality of antennas to a plurality of antenna groups, a message including one or more antenna IDs belonging in each of the antenna groups and information saying that a transmission timing at which a terminal device can transmit a ranging code is limited for each of the one or more antenna IDs,
receiving, by the terminal device, the message;
identifying, by the terminal device, the antenna ID; and
transmitting, by the terminal device, the ranging signal at the designated transmission timing based on the information; and
detecting, by the base station device, the received ranging code at the transmission timing assigned to the antenna which receives the ranging signal based on the information.

6. A radio communication method in a cellular radio communication system comprising:
a base station device; and
a plurality of antennas connected to the base station device, wherein the method comprises
in a communication state or a synchronous state,
transmitting, by the base station device, antenna IDs for identifying the antennas from the respective antennas;
receiving, by a terminal device, the antenna IDs transmitted by the base station device;
notifying, by the terminal device, the base station device of a change in an antenna group when the antenna ID of the antenna that can ensure an excellent reception characteristic is changed;
managing, by the base station device, the antenna group for each terminal device;
limiting, by the base station device, the antenna to one or a plurality of antennas within the changed antenna group; and
detecting, by the base station device, a received ranging code when receiving the notification.

7. A base station device in a cellular radio communication system comprising:
   the base station device configured to receive a ranging signal from a terminal device in an initial access of the terminal device or periodically or when transiting from a non-communication state to communication state; and
   a plurality of antennas connected to the base station device, wherein
   the base station device is configured to transmit antenna IDs for identifying the antennas from the respective antennas;
   the base station device, by grouping the plurality of antennas to a plurality of antenna groups, is configured to broadcast a message including one or more antenna IDs belonging in each of the antenna groups and information saying that a group of usable ranging codes where the terminal device transmits the ranging signal is limited for each of the one or more antenna IDs;
   the base station device is configured to:
   receive a signal in which the terminal device receives the message;
   identify the antenna ID;
   select one ranging code from the group of the usable ranging codes corresponding to the antenna ID based on the information; and
   transmit the selected ranging code; and
   the base station device is configured to detect the received ranging code by making the group of the usable ranging codes of the antenna which receives the ranging signal as candidate based on the information.

8. A base station device in a cellular radio communication system comprising:
   the base station device configured to receive a ranging signal from a terminal device in an initial access of the terminal device or periodically or when transiting from a non-communication state to communication state; and
   a plurality of antennas connected to the base station device, wherein
   the base station device is configured to transmit antenna IDs for identifying the antennas from the respective antennas;
   the base station device, by grouping the plurality of antennas to a plurality of antenna groups, is configured to broadcast a message including one or more antenna IDs belonging in each of the antenna groups and information saying that a transmission timing at which a terminal device can transmit a ranging code is limited for each of the one or more antenna IDs;
   the base station device is configured to
   receive a signal in which the terminal device receives the message;
   identify the antenna ID; and
   transmit the ranging signal at the designated transmission timing on the basis of the information; and
   the base station device is configured to detect the received ranging code at the transmission timing assigned to the antenna which receives the ranging signal on the basis of the information.

9. A base station device in a cellular radio communication system comprising:
   the base station device; and
   a plurality of antennas connected to the base station device, wherein
   in a communication state or a synchronous state, the base station device is configured to transmit antenna IDs for identifying the antennas from the respective antennas;
   the base station device is notified of a change in an antenna group when the antenna ID of the antenna that can ensure an excellent reception characteristic is changed, where a terminal device receives the antenna IDs transmitted by the base station device; and
   the base station device is configured to manage the antenna group for each terminal device, limit the antenna to one or a plurality of antennas within the changed antenna group, and detect a received ranging code when receiving the notification.

10. A terminal device in a cellular radio communication system comprising:
    the terminal device;
    a base station device configured to receive a ranging signal from a terminal device in an initial access of the terminal device or periodically or when transiting from a non-communication state to communication state; and
    a plurality of antennas connected to the base station device, wherein
    the terminal device is configured to receive, from the base station device, antenna IDs for identifying the antennas from the respective antennas;
    the terminal device is broadcasted, from the base station device by grouping the plurality of antennas to a plurality of antenna groups, a message including one or more antenna IDs belonging in each of the antenna groups and information saying that a group of usable ranging codes where the terminal device transmits the ranging signal is limited for each of the one or more antenna IDs;
    the terminal device is configured to:
    receive the message;
    identify the antenna ID;
    select one ranging code from the group of the usable ranging codes corresponding to the antenna ID on the basis of the information; and
    transmit the selected ranging code; and
    the terminal device is configured to make the base station device detect the received ranging code by making the group of the usable ranging codes of the antenna which receives the ranging signal as candidate based on the information.

11. A terminal device in a cellular radio communication system comprising:
    the terminal device;
    a base station device configured to receive a ranging signal from a terminal device in an initial access of the terminal device or periodically or when transiting from a non-communication state to communication state; and
    a plurality of antennas connected to the base station device, wherein
    the terminal device is configured to receive, from the base station device, antenna IDs for identifying the antennas from the respective antennas;
    the terminal device is broadcasted, from the base station device by grouping the plurality of antennas to a plurality of antenna groups, a message including one or more antenna IDs belonging in each of the antenna groups and information saying that a transmission timing at which a terminal device can transmit a ranging code is limited for each of the one or more antenna IDs;
    the terminal device is configured to:
    receive the message;

identify the antenna ID; and transmit the ranging signal at the designated transmission timing on the basis of the information; and the terminal device is configured to make the base station device detect the received ranging code at the transmission timing assigned to the antenna which receives the ranging signal based on the information.

12. A terminal device in a cellular radio communication system comprising:

the terminal device;

a base station device; and a plurality of antennas connected to the base station device, wherein in a communication state or a synchronous state, the terminal device is configured to receive, from the base station device, antenna IDs for identifying the antennas from the respective antennas;

receive the antenna IDs transmitted by the base station device, and notify the base station device of a change in an antenna group when the antenna ID of the antenna that can ensure an excellent reception characteristic is changed; and make the base station device manage the antenna group for each terminal device, limit the antenna to one or a plurality of antennas within the changed antenna group, and detect a received ranging code when receiving the notification.

* * * * *